United States Patent [19]

Ribas

[11] Patent Number: 5,049,198
[45] Date of Patent: Sep. 17, 1991

[54] CALCIUM SULFATE PROCESS FOR THE COPRODUCTION OF PORTLAND CEMENT CLINKER AND CONCENTRATED SULFUR DIOXIDE ADEQUATE TO MANUFACTURE SULFURIC ACID

[76] Inventor: Roger S. Ribas, 8626 Braeburn Valley Dr., Houston, Tex. 77074

[21] Appl. No.: 206,018

[22] Filed: Jun. 10, 1988

[51] Int. Cl.$^5$ .............................................. C04B 7/04
[52] U.S. Cl. .................................. 106/739; 106/759; 106/765; 432/14; 432/106
[58] Field of Search ............... 423/178, 171, 172, 178; 106/100, 101, 102, 103, 739, 759, 765; 432/14, 106

[56] References Cited

U.S. PATENT DOCUMENTS

| | | | |
|---|---|---|---|
| 4,251,280 | 2/1981 | Heian | 106/100 |
| 4,260,369 | 4/1981 | Warshawsky | 106/100 |
| 4,276,020 | 6/1981 | Shibuya et al. | 106/100 |
| 4,298,393 | 11/1981 | Brachthauser | 106/100 |
| 4,556,428 | 12/1985 | Wolter et al. | 106/100 |
| 4,561,842 | 12/1985 | Nielson | 106/100 |
| 4,576,644 | 3/1987 | Goldmann | 106/100 |
| 4,608,238 | 8/1986 | Wilson, Sr. et al. | 423/178 |
| 4,627,877 | 12/1986 | Ogawa et al. | 106/103 |
| 4,662,945 | 5/1987 | Lawall | 106/100 |

FOREIGN PATENT DOCUMENTS 1289342 9/1972 United Kingdom .

Primary Examiner—William R. Dixon, Jr.
Assistant Examiner—Paul Marcantoni
Attorney, Agent, or Firm—Townsend and Townsend

[57] ABSTRACT

This invention isolates in separate furnaces the three thermochemical processes required in manufacturing Portland cement and sulphur dioxide from a calcium sulfate source so as to yield improved pyrometallurgical treatment for each individual process. Separating these processes facilitates selection of the most kinetically suitable reactions by enabling the maintenance of optimum conditions for each process without compromising the thermal or kinetic efficiencies of the other processes.

Only one fourth of the calcium sulfate is reduced to calcium sulfide in a separate ad hoc reduction furnace specifically designed for achieving enhanced reduction parameters which results in minimized reduction equipment size. Treating most of the calcium sulfate elsewhere works to avoid side reactions and allows Portland cement raw mix components to have an enhanced synergistic catalytic effect on reduction kinetics. Compounds deleterious to both Portland cement and sulfuric acid, such as alkalies and fluorides, are removed with the reduction furnace gases while high concentrations of sulphur dioxide are achieved in the gases reporting to the sulfuric acid plant.

Three fourths of the calcium sulfate is made to react separately and simultaneously in a flash calciner with the calcium sulfide to produce sulphur dioxide and calcium oxide. At the flash calciner heat of radiation from exothermic combustion reactions is applied directly to the highly endothermic desulfurization of calcium sulfate under an oxidizing atmosphere. The calcium oxide and other Portland cement components are then discharged onto a short rotary kiln where only clinkering reactions take place at high thermal efficiencies for enhanced throughput, minimized furnace size, and lower burning zone temperatures.

15 Claims, 3 Drawing Sheets

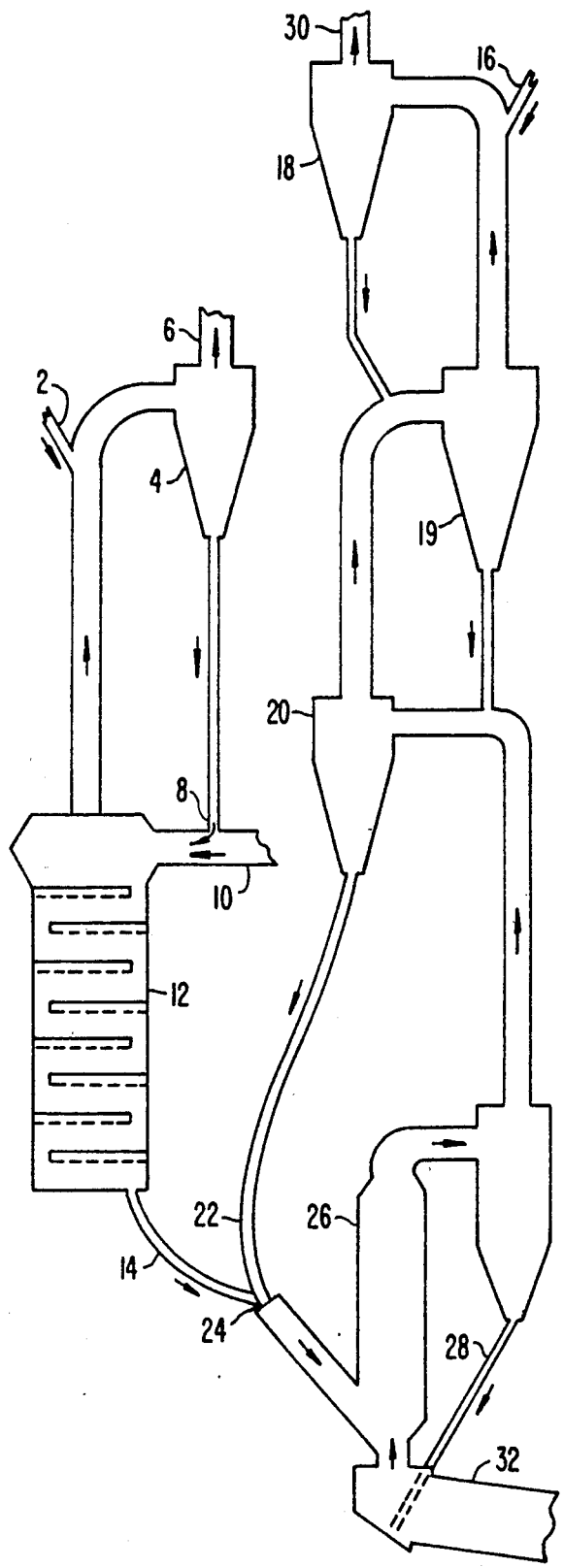
FIG._1.

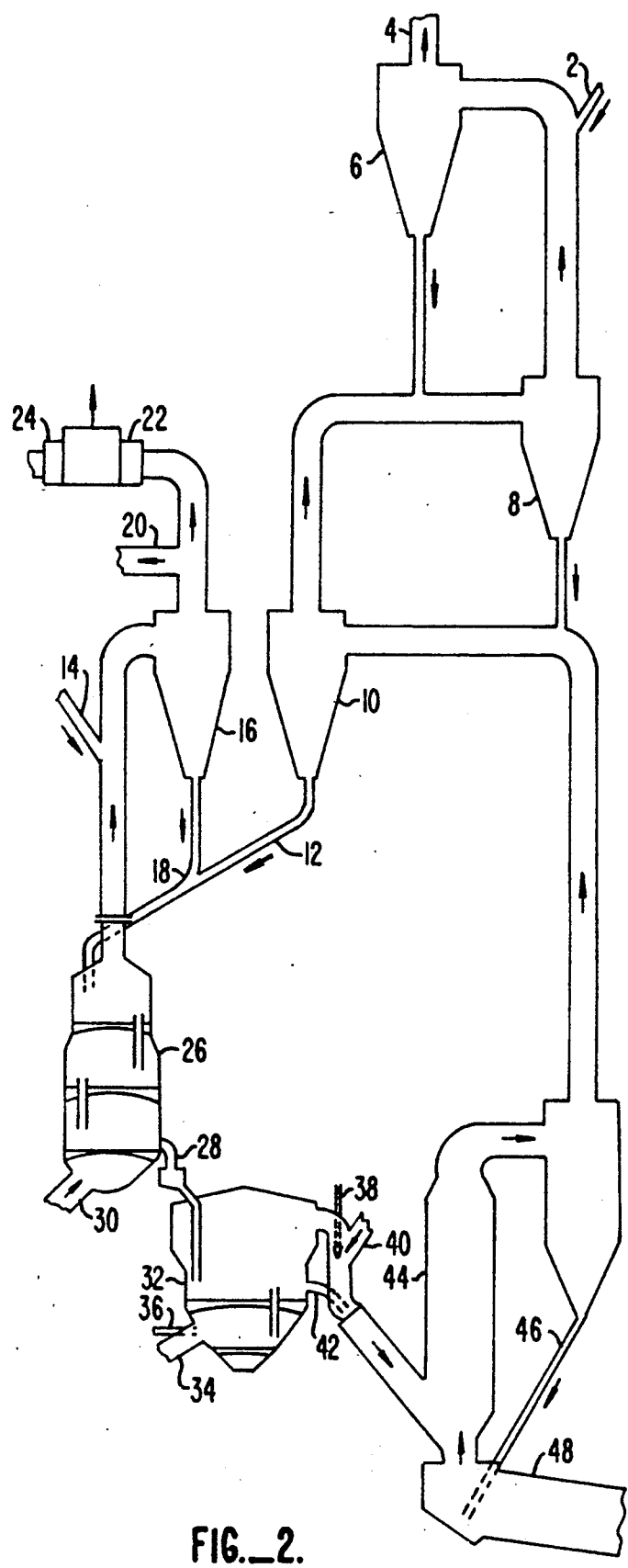
FIG._2.

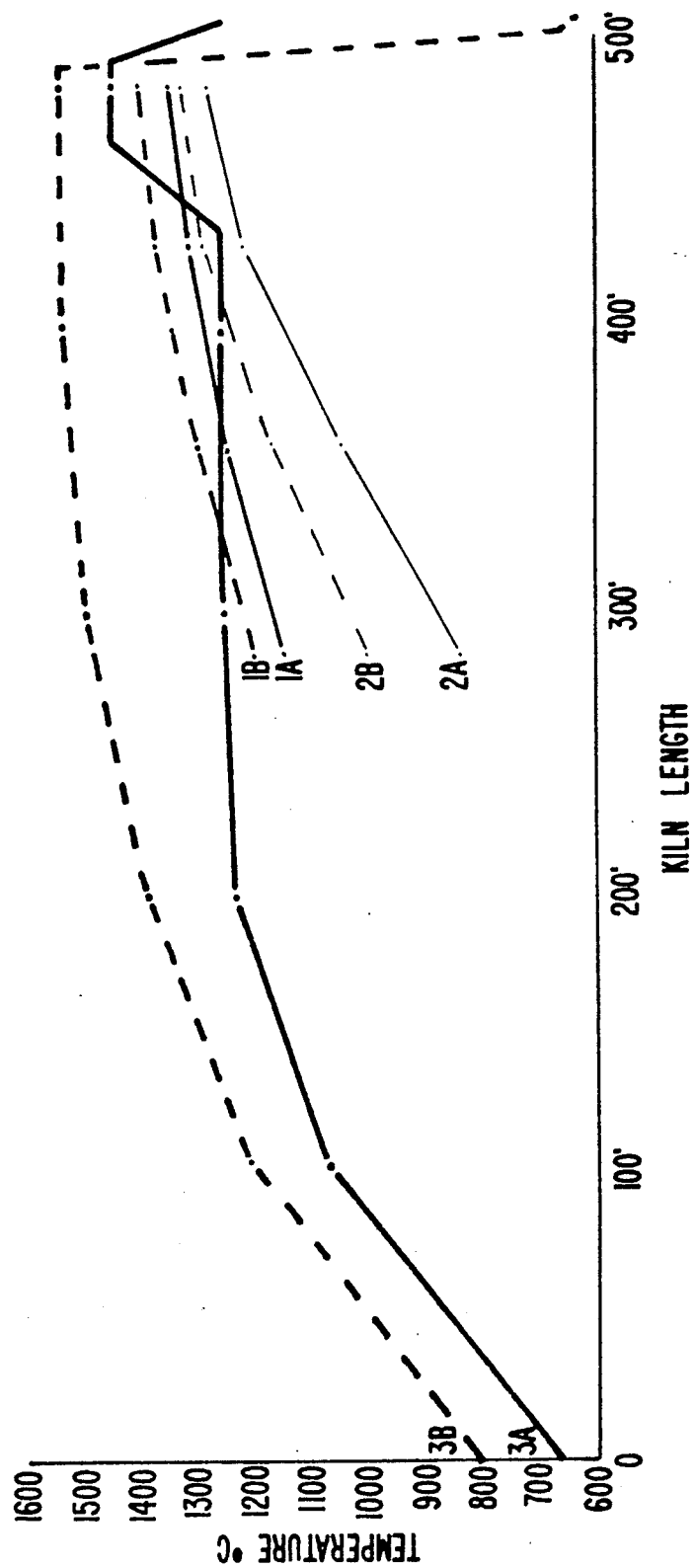
FIG._3.

CALCIUM SULFATE PROCESS FOR THE COPRODUCTION OF PORTLAND CEMENT CLINKER AND CONCENTRATED SULFUR DIOXIDE ADEQUATE TO MANUFACTURE SULFURIC ACID

BACKGROUND

1. Field of Invention

This invention relates to portland cement manufacture, specifically to an improved process of thermal reduction and decomposition of gypsum when used as a source of lime in portland cement.

2. Discussion of Prior Art

In the massive masonry constructions of the Egyptians we meet with our present day system of uniting blocks and slabs with a mortar consisting of a mixture of sand with a cementations material. While the typical Egyptian mortar has been generally described by writers on Egypt as burnt lime, even when found in buildings as old as the great pyramids chemical examination shows that the Egyptians never used lime until the Roman period and that the cementing material was always obtained by burning gypsum.

Scientists have studied the decomposition of calcium sulfate since the turn of this century. Lunge in 1903 was the first to suggest that calcium sulfate could be directly decomposed to sulfur dioxide by heating with clay in a shaft kiln, with cement clinker formed as a by-product.

In 1908, Hofman and Mostowithsch published studies showing the effect of temperature on speed of decomposition of calcium sulfate with additives. Actual development and process implementation took place in Germany. U.S. Pat. No. 1069191, 8/1913 to Von Schlippenback already illustrates a calcium sulfate burning process. In 1915 W.S. Mueller investigated the decomposition of calcium sulfate with additives in the laboratory, but the successful development of the process to plant scale was carried out by H. H. Kuhne., Thus, in 1918 a sufficiently concentrated sulphur dioxide gas and good cement clinker were produced. The Muller-Kuhne technology of cement-sulphuric acid manufacture was relatively widely adopted in Europe starting in the 1920's with most successful operations by Marchon in England at Whitehaven and Billingham, England. Other countries which have built plants based on this technology are France, Austria, South Africa and Poland. The situation in England is typical of all cases where this process has been used and can be summarized as follows:

a) sulphuric acid was needed to support other chemical operations.

b) The British government limited sulphur imports due to a balance of payment problem and refused to allow additional sulphur imports.

c) Large reserves of gypsum, and coal were locally available at attractive prices.

d) "Home"-produced chemicals would be protected by duties on imported chemicals.

To date this process has not been able to "stand alone" when the alternative was to burn sulphur to produce sulphuric acid without help from economic forces outside of those normally used to evaluate the merits of a chemical process. This situation is unchanged today for the gypsum based sulphuric acid-cement plants operating in both South Africa and Poland.

Essentially, the process comprises heating the gypsum or anhydrite with reductant to produce sulphur dioxide and lime. Other additives such as silica, ferric oxide, and alumina are added as required for portland cement manufacture.

Three reaction stages are recognized. In the reduction stage carbon reacts with one fourth of the calcium sulfate source at 900°–1000° C.

$$4CaSO_4 + 2C = CaS + 3CaSO_4 + 2CO_2 \qquad (1)$$

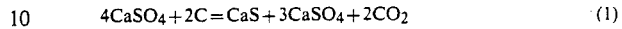

This is followed by a decomposition step, where calcium sulfide reacts with the remaining calcium sulfate at a considerably higher temperature (1200° C.) to form sulphur dioxide:

$$CaS + 3CaSO_4 = 4CaO + 4SO_2. \qquad (2)$$

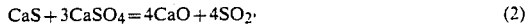

The overall reduction - decomposition course corresponds to the reaction $$2CaSO_4 + C = 2CaO + CO_2 + 2SO_2 \qquad (3)$$

The standard recombination reactions to form the clinkering compounds i.e., dicalcium and tricalcium silicate begin when the lime is completely desulfurized and the temperature increased to 1400° C. to 1450° C.

All of these reactions take place in a long kiln. The most significant improvements have addressed the treatment of the raw materials and improved pre-heating and heat exchanging equipment at the feed end of the kiln, for example, German patent 1206193 for 1970; German patent 1285864 for 1971, and U.S. Pat. No. 3,865,602, Feb. 11, 1975 to O.S.W.

Calcium sulfate decomposes at 1100°–1200° C. while decarbonation of $CaCO_3$ occurs at 900° C. The endothermic heat of reaction of the sulfates decomposition is 36% higher than in the case of its carbonate counterpart.

The higher heat of reaction and temperature are not a major problem in themselves but their combined effect being considerably magnified by the poor heat transfer characteristics of the rotary kiln is a major disadvantage.

In effect, the reduction reaction, the decomposition reaction and the clinkering reactions all take place in a rotary kiln. In the rotary kiln the material enters the upper or more elevated end, and due to the rotation of the kiln, passes downwardly. All of the fuel is injected and is burned at near the lower end, typically called the "burning zone". The formation of clinker also takes place at the lower end where it benefits from heat of radiation provided by the flame. In this manner two important requirements are met: the mass of solids reaches about 1450° C. at which temperature incipient melting occurs while all particles are equally exposed to the heat of radiation of the flame due to the tumbling action and mixing provided by the rotating kiln. Under this conditions the recombination solid reactions between calcium and silica tetrahedra known as clinkering take place in a most uniform manner and a homogeneous portland cement is produced.

The combustion gases passing upwardly from the clinkering zone then are expected to provide the heat for the decomposition reaction which is strongly endothermic (64K cal per mole) which creates a "heat sink" within the solids mass i.e., a cooling effect caused by the endothermic reaction. Additionally heat needs to be provided so that the solids reach 1200° C. which is the decomposition reaction temperature.

Unfortunately, heat transfer between the combustion gases and the mass of solids is relatively poor. Also, we have to keep in mind that while heat of radiation is being transmitted at the rate of the fourth power of the temperature differential between the flame and the wall of the kiln at the clinkering or lower end of the kiln, the mass of solids undergoing the decomposition reaction can only count on convection and conduction which is of the order of the first power of the temperature differential between solids and gases.

Characteristic temperature profiles for both gases and solids are shown on FIG. 3—Curves 3A and 3B. It is noticeable that the curves largely deviate from each other in the portion of the kiln undergoing the decomposition reaction. In fact for a substantial portion of the kiln length the temperature of the solids is almost constant and the decomposition and desulfurization of calcium sulfate almost resembles an isothermal process such as the boiling of water. Furthermore, another important disadvantage of the prior state of the art is posed by the proximity of solids blanketed by said endothermic decomposition reaction to the clinkering or burning zone of the kiln which creates a cyclical operating and control problem i.e., having the burning zone of the kiln intermittently "cooled" by the endothermic decomposition reaction. The word "cooled" is used to indicate the effect on the reacting solids of high amounts of heat being absorbed at the wrong kiln location or zone.

Continuing upwardly in the kiln towards the feed end, the combustion gases enter the area of the kiln where the reduction of calcium sulfate to calcium sulfide takes place. In order to accomplish this reaction at a minimum temperature and retention time careful control of reduction variables is necessary. This is not possible in the kiln process since the optimum reduction atmospheres cannot be controlled. In fact oxidizing conditions are more suitable in the other two reaction zones already discussed. In order to maintain reduction atmospheres at the feed end, efficiency is sacrificed in the thermochemistry of the rest of the kiln.

Under reducing conditions we may have the following set of reactions:

$CaSO_4 + 2C = CaS + 2CO_2$
heat of reaction: $+36.3$ K cal/mole
(endothermic)
$2C + 2CO_2 = 4CO$
heat of reaction: $+82.4$ K cal/mole
(endothermic)
$CaSO_4 + 4CO = CaS + 4CO_2$
heat of reaction: $-46.1$ K cal/mole
(exothermic)

Now under oxidizing atmospheres we can have:

$4C + 2O_2 = 4CO$
heat of reaction: $-105.6$ K cal/mole
(exothermic)
and
$CaSO_4 + 4C + 2O_2 = CaS + 4CO_2$
heat of reaction: $-151.3$ K cal/mole
(exothermic)
or
$C + O_2 = CO_2$
heat of reaction: $-94.052$ K cal/mole
(exothermic)

This reaction as well as the combustion of carbon monoxide can occur at 750° C. to 800° C. thus using up carbon over and above the ratio of 0.5 moles of C per mole of $CaSO_4$ stipulated by Kuhne.

Also the same gas-solid heat transfer limitations pointed out for the other zones are even more critical at the feed of the kiln where we are trying to carry the more complex reduction reactions. Thus, the reduction to CaS is limited by its inclusion at the feed end of the kiln which is a serious disadvantage. Additionally the kinetics of various reduction reactions are different and we should be able to control and optimize conditions which aim at the reaction which offers the most favorable kinetics.

It should be obvious to those familiar with the state of the art that the only way to overcome these problems in the Muller-Kuhne type technology is by adding substantial length to the kiln and decreasing its through put as a higher retention time is in order. It is also required to maintain a very high flame temperature and burning zone temperature, as well as the need of an excessive amount of fuel. All of the above requirements translate in serious operating and maintenance cost disadvantages.

Some of the prior art as mentioned above attempt to overcome the waste of heat energy with the gases exiting the kiln which is an advantage. However, they do not deal with the sources of the problem, most of which, as above explained are related to attempting to carry all three reactions in the rotary kiln.

In view of the above it may not be so striking that the clinker yield of similar kiln units is typically only half as large with the calcium sulfate process as when using calcium carbonate in a normal portland cement raw mix.

In addition to those prior art references which follow the orthodox Muller-Kuhne technology there are other desulfurization techniques worthy of mention. In U.S. Pat. Nos. 3,087,790 for 4/1963, 3,260,035 for 7/1966 and U.S. Pat No. 4,102,989 for July 25, 1978 to Wheelock et al., the thermal reduction and decomposition of gypsum are also limited by their taking place in a single furnace as we already explained for the Kuhne technology although the more efficient fluidized bed reactor is used. U.S. Pat. No. 4,312,842 for Jan. 26, 1982 to Wilson et al., also teaches the combination of the reduction and decomposition (desulfurizing) reaction in a fluidized bed reactor. In this art reduction is carried at a high temperature and low reaction rate to accommodate the decomposition reaction which leads into high capital cost of equipment. In this case the objective is reaction of $2CaSO_4 + C = 2CaO + CO_2 + 2SO_2$ which takes 1.5 hrs of retention time at 1200° C. while reduction reaction $CaSO_4 + 2C = CaS + 2CO_2$ and/or
$CaSO_4 + 4CO = CaS + 4CO_2$
$CaSO_4 + 4H_2 = CaS + 4H_2O$ already mentioned above in our discussion of the Kuhne technology takes place in 15 to 20 minutes when reduction conditions are geared to just this reaction. Also, the reaction to CaS uses one fourth of the gypsum while CaS later reacts with the remainder of the gypsum charge (¾) in the following decomposition step. Thus, the specialized reduction step can be performed in substantially smaller equipment when the two reactions are kept separate. Portland cement clinker is not continuously produced but lime is their objective. Presumably portland cement could be manufactured from this lime, but at a great expense of reheating it from atmospheric conditions to 1350°–1450° C.

U.S. Pat. No. 4,503,018 for Mar. 5, 1985 to McKee teaches desulfurization of phosphogypsum in a traveling-grate type sinter machine. Although they recover sulfur dioxide for sulfuric acid manufacture their byproduct is a sinter unsuitable for the manufacture of portland cement. The main advantage claimed by this system is increased production rate of sulfur dioxide.

U.S. Pat. No. 4,608,238 for August 1986 to Wilson & Spigolon describe a mechanism for desulfurization of gypsum which combines a sintering type machine with an electric furnace. Even if the byproduct clinker obtained in this fashion were of sufficient quality for portland cement manufacture it would have been obtained by melting the raw mix at a temperature of approximately 400° C. higher than that needed in the Kuhne rotary kiln process where only incipient melting is required to equalize temperature conditions throughout each nodular mass or clinker.

Another disadvantage of the above mentioned patents which use a traveling-grate is the same thermochemical limitation noted for the fluidized bed reactor process i.e., that both reduction and decomposition occur simultaneously, thus the optimum conditions for each are not provided. In the McKee patent reduction and calcination take place in the "firing" section of the grate. The Wilson patent distinguishes a reduction zone and a calcination zone, but since $SO_2$ is produced in the reducing zone it is quite evident that both zones have the same thermochemical purpose. If the purpose of reduction were to reduce to CaS exclusively, $CO_2$ would only be produced.

$$CaSO_4 + 2C = CaS + 2CO_2$$

The traveling-grate processes are likewise limited by the fact that the full amount of gypsum for complete conversion to CaO is charged as pellets at the preheating or dehydration zone and then move on to the reduction and/or oxidizing zones of the furnace, while as proposed herein only one fourth of that amount of gypsum is required by a separate reduction reactor.

This fact contributes to what has already been stated, that only simultaneous reduction and decomposition can be accomplished by the traveling-grate, sinter system.

Finally, it is a historical fact that portland cement raw mixes are better burned in a fine particle state so that homogenization to achieve the right chemical composition is not hampered. In U.S. Pat. Nos. 4,312,842, and 4,608,238 this deficiency is solved by melting in an electric furnace. In addition of the thermal disadvantage already pointed out there is a problem with the quality of the cement itself.

First of all, the clinker produced in the electric furnace is harder than regular clinker and requires a higher level of grinding energy. Then, there is the consideration of the clinker structure itself. Formation of $C_3S$ is associated with the amount of liquid formed in a kiln at the burning zone. The fact that a melt is produced in the case of the electric furnace would indicate that a potential for the formation of a considerable amount of $C_3S$ is inherent to this system. However, both $C_3S$ and $C_2S$ are unstable structures. Some of the $C_3S$, where high values of this compound are attained, reverts to CaO and $C_2S$. Under certain conditions of cooling there is a tendency to dust and conversion of $C_2S$ from the beta form to the gamma form. The reason why gamma $C_2S$ is formed in the case of the electric furnace melt is attributed in part to the higher crystallization temperature and molten conditions while there is a longer cooling period inherent to cement made at high temperature.

Thus melting conditions produce a more perfect crystal in the case of $C_2S$ of the gamma form. The problem is that crystals with a deformed or strained lattice typically produced under conditions of incipient melting in a kiln burning zone are reactive, while the perfect crystals obtained in the high temperature melt are unreactive. Thus beta$C_2S$ (made in a kiln) has an irregular structure and hydrates. Gamma$C_2S$ produced in an electric furnace melt is non-hydraulic. The irregularity of the coordination of Ca in the unstable structures, such as $C_3S$ and beta$C_2S$ is concomitant with the existence of structural holes. This holes are essential to the hydration processes taking place in portland cement. The structures of calcium silicates or aluminates which exhibit holes and have good hydrating properties are $C_3S$, beta$C_2S$, $C_3A$, $C_{12}A_7$, CA and $C_4AF$.

The structures of calcium silicates or aluminates which do not hydrate (perfect crystals obtained from high temperature melts) and which are close in composition to the above are regular and there are "no holes". These crystals are gamma$C_2S$, betaCS and $C_2AS$. Considering all the disadvantages of using an electric furnace we intend to keep a short length of the kiln to perform the clinkering reactions (burning zone already described) in our proposed method.

In view of the above, it is easy to understand why electric furnaces have not found wide application in portland cement making. Only in specialized cases to produce high alumina cements which require very high temperatures. There is some merit, however, to the removal of P, F and other impurities from phosphogypsum in the electric furnace art. Nevertheless, impurity removal can be accomplished ahead of the reduction step more effectively, without jeopardizing the quality of the portland cement produced. Ref. Case, Dreschel patents. Also Australian, English and Indian practice.

OBJECTS AND ADVANTAGES

What this invention accomplishes is to improve the process of burning gypsum to make standard portland cement (ASTM type I and II) and recover sulfur dioxide for the manufacture of sulfuric acid. Although the basic technology and reactions are known since the turn of the century it has only been competitive in countries where sulfur was scarce and other regional factors contributed to its economics.

The increased world demand for sulfur in recent years and its subsequent increase in price coupled with recent competition in the U.S. market of foreign cement and/or clinker provide an increased relevance to our proposed improvements of the old Kuhne technology. Three consecutive years of increased U.S. shipments have seen industry volume climb to near all-time highs in demand. Unfortunately, this is proving to be a profitless prosperity. The almost 84 million tons shipped during 1985 were in a market place characterized by aggressive pricing policies. Meanwhile new record imports of 14.5 million tons—and reaction to them—created controversy and contradiction among domestic producers as this imports became a fact of life in the nation's supply structure. The industry's shake out and re-structuring continues. More companies have been sold, plants closed, and management changed. What U.S. cement requires is innovative technology to meet the lower priced foreign cement with substantially reduced manufacturing costs. The technology described herein has accomplished this goal by making possible the reduction of portland cement manufacturing cost by 50%.

In effect the proposed improvements enhance the ability to utilize natural anhydrite as well as waste gypsum from phosphoric acid filtration in the dihydrate or monohydrate processes, to reduce the manufacturing cost of portland cement as well as reducing the manufacturing cost of chemical products and industries where cheaper sulfuric acid made with the recycled sulfur dioxide will be used instead of requiring the burning of elemental sulfur.

One important object and advantage of my invention is that it treats each of the three different thermochemical reactions required by the utilization of calcium sulfate in the production of portland cement in separate individual furnaces recognizing the fact that this is the best way to be able to generate the optimum conditions for pyrometallurgical variables affecting each processing step while producing a portland cement of high quality.

As we have described in our analysis of the prior art these main thermochemical milestones have been combined either all three together or two of them in a single piece of equipment at the risk of some thermal or qualitative inefficiency. This inefficiency results from having to compromise optimum pyro-chemical requirements of one thermochemical reaction to satisfy necessary conditions required by its co-reaction counterpart and vice-versa. Although, some of the prior art do not have the complete objective of producing a "merchant grade" portland cement, they have been included in our discussion to emphasize the significance of our improved process related to the steps which we do have in common with them. Accordingly, several objects and advantages of my proposed invention are:

I) Ascertain that the Chemical Reduction Reactions to CaS are:

$$CaSO_4 + 2C = CaS + 2CO_2 \text{ or}$$

$$CaSO_4 + 4CO = CaS + 4CO_2$$

$$CaSO_4 + 4H_2 = CaS + 4H_2O$$

and not $$2CaSO_4 + C = 2CaO + CO_2 + 2SO_2$$

with less favorable reaction kinetics and which has been mentioned in our review of the prior art as taking place when reduction and decomposition are performed in the same furnace.

a) Improved control of the reduction reaction by performing it solely in ad hoc equipment originally designed for efficient reduction. This equipment can be:

a$_1$) shaft furnace variations used in direct iron reduction i.e., HYL, ARMCO and Midrex processes. This has the disadvantage of requiring pelletized feed which makes the manufacture of a high quality portland cement more difficult inasmuch at it requires exacting chemical control.

a$_2$) oscillating plate furnaces using electron beam for heating.

a$_3$) Herreshoff furnace.

a$_4$) fluidized bed reactor. Although they perform better in roasting than in reduction roasting, this is our choice for embodiment No. 2 where all CaSO$_4$ is fed to the reduction reactor and throughput is an important consideration.

a$_5$) lower chamber of two stage flash calciner. Our preferred selection for embodiment No. 1 is the Herreshoff whereby we can also obtain b) Improved ability to use gaseous reductants efficiently, improved injection of reducing gases and improved control of reduction atmospheres. For example, to each hearth of a multiple hearth unit we can inject various amounts of any one of the following fuels as a source of reductants: coal or a variety of carbon or hydrocarbon containing materials such as coke, lignite, reformed natural gas, producer gas, oil or mixtures thereof.

c) Ability to handle fine particle size waste gypsum from phosphoric acid manufacture without need to pelletize agglomerating or other pre-treatment steps.

d) Ability to reduce to CaS at a minimum temperature 750° C.

e) Ability to complete reaction at a minimized retention time (15 to 20 min vs 1.5 hrs in the prior art) which translates into substantial reduction in equipment size. (4 to 6 times smaller)

f) Since only the reduction to CaS is specified in this step one fourth of the calcium sulfate normally necessary for complete decomposition and desulfurization to CaO (see below) is required. Thus, this also translates in reduced equipment size.

g) Our invention teaches that three fourths of the required calcium sulfate bypass reduction contrary to all of the prior art practice consequently the possibility of side reactions is altogether avoided.

It should be pointed out that in the prior art reduction and decomposition occur simultaneously in parts of the equipment labeled "firing zone" or "reducing zone", and the total amount of gypsum required for desulfurization is provided at the on set. Thus, our semantics in our "reduction reaction" step refers not only to the type of atmosphere provided but to the nature of the chemical reaction actually taking place.

II) Ascertain that the modern pre heater-flash calciner can be applied to the decomposition step. The key to the successful application of the flash calciner to the decomposition reaction in our invention is that the preheater precalciners are fed the main portion of the CaSO$_4$ while the reduction to CaS is kept away from the preheater precalciner. As we have stated reduction of one fourth of the gypsum takes place separately and simultaneously.

Thus, in this step one mole of calcium sulfide produced in the first step will react with another three moles of calcium sulfate according to the following reaction:

$$3CaSO_4 + CaS = 4CaO + 4SO_2$$

The decomposition reaction furnace will be fed the additional calcium sulfate directly and it is here where improved heat transfer is of the essence since this well known reaction is highly endothermic. This is in contrast with the reduction reaction to CaS where the most important variables were the appropriate control of reduction atmospheres and kinetics. The preferred furnace for this step is a flash calciner. There are a number of manufacturers which offer flash calciners: IHI, Onoda, Nihon, etc.

The main advantage for using a flash calciner in this step is that radiation heat is applied directly to the decomposition reaction, thus providing an immediate response to the largely endothermic reaction which otherwise will have a cooling effect on the solids by absorbing large amounts of heat. By this means we are correcting a major disadvantage of the Muller-Kuhne type variation of processes which feature a long kiln as explained above.

In addition to the improved control over the decomposition reaction we are substantially reducing the length of the kiln which will now only be performing the clinkering reactions. The above advantages should be contrasted with the prior art where heat of conduction and convection from the kiln gases are used to provide heat to the highly critical decomposition reaction. These arrangement provides a kiln output equivalent to 3 or 4 times the unit production of a kiln of similar diameter in the prior art.

The only other furnace which could be considered for this step is a fluidized bed reactor, but this equipment has operational and maintenance disadvantages for this application. In effect, some of the silica, iron and aluminum required by the portland cement formulation is already added during the reduction step in order to perform the reduction reaction to calcium sulfide at the lowest possible temperature and at the fastest reaction rate. Thus, the possibility exists that monocalcium and other silicates begin to form during the second step which will affect the operation of the fluidized bed reactor by sinterized deposits.

Another disadvantage of the fluidized bed reactor is the additional maintenance required when gas pressure and flow stops with solids accumulating at the bottom of the reactor bed which is typically a gas distribution plate. This requires shut down and physically removing the cooled solids by manual labor. This is not a problem in the flash calciner since under the same circumstances the solids will fall directly onto the kiln.

III. Limitation of the role of the kiln to clinkering reactions.

The equipment most suitable to provide tumbling action for gentle mixing during incipient melting required by the solids' reactions known as "clinkering" in portland cement manufacture is the kiln. At the burning zone of the kiln clinkering temperatures of 1450° F. are reached without delay by the application of the heat of radiation provided by the burner flame. This is well known in the prior Muller-Kuhne art. What is different in this case is that the burner will not have to provide additional heat of conduction and convection via excess combustion gases to perform the decomposition reaction since the latter occurs outside the kiln.

One advantage of the proposed system is that the kiln length will be reduced to 40% of that used in the prior art. Another advantage is that kiln rotational speed will be increased 3 to 4 times the typical RPM used in the prior art. Another advantage is that portland cement types I and II could be typically burned at 1350° C. instead of 1450° C. or higher in the prior art. Another advantage will be a more steady control of the kiln without having solids undergoing an endothermic reaction sporadically cooling the burning zone and throwing the kiln in what the operators call the "hole". All of this will reflect in an increased operating factor and throughput.

Another advantage will be that portland cement of consistent quality will be produced at all times without the need to have to segregate large amounts of material not properly burned in special storage facilities. Since portland cement produced at a reduced cost is one of the products aimed at by the practice of this method we cannot take a casual look at the quality of the clinker produced as some of the recent patents which burn gypsum to recover $SO_2$ in traveling-grates and/or melt raw mix in electric furnaces seem to take.

In regard to several patents in the prior art which combine traveling-grates and electric furnace we claim an advantage in the fact that in our system we are capable of producing imperfect crystals typically suited for hydration reactions while crystals produced in an electric furnace in a molten fashion are perfect silicate crystals with poor hydration properties.

Other objectives and advantages of the three step process are:

1) Large capacity plants can be built with small-kiln dimensions.

2) Lengthening the life of refractory brick.

3) Heat losses are reduced 3–10% relative to the prior long kiln technology.

4) Generation of nitrogen oxides is reduced by lower flame temperatures and the short time gases spend in the heating zone relative to the prior art where all fuel is fed at 1450°–1550° C.

5) Improved ability to automate each part of the process lending it more amenable to computer control.

Further objects and advantages of my invention will become apparent from a consideration of the drawings and ensuing description of it.

DESCRIPTION OF INVENTION

FIG. 1 is a flow diagram of the first embodiment of my invention. Under this concept one fourth of the reacting calcium sulfate source is reduced to calcium sulfide in reduction furnace 12. Separately and simultaneously three fourth of the calcium sulfate fed to the system is preheated in three stages of suspension preheaters 18, 19, 20, and reacted with the calcium sulfide issued at furnace 12 in a flash calciner 26 to produce calcium oxide and sulfur dioxide,

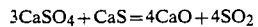

$$3CaSO_4 + CaS = 4CaO + 4SO_2$$

The calcium oxide with other portland cement raw mix materials which have been fed to the system at 2 and 16 are discharged onto a rotary kiln 32 whose only function is performing the solid reactions (mainly between calcium oxide and silica) known as clinkering.

Sulfur dioxide rich gases leave the system at 30 to be treated at the sulfuric acid plant. Combustion gases from the reduction furnace separately leave the system at 6. These gases are rich in $CO_2$ which is a coproduct in the reduction of calcium sulfate to calcium sulfide.

Keeping the gases from reduction separate from those of decomposition offer the ability to remove any fluorine remaining in the calcium sulfate source, when that source is byproduct gypsum from phosphoric acid manufacture sometimes referred to as phosphogypsum. Consequently, there will be no fluorine contamination in the gases leaving the flash calciner. Additionally, the gases issuing from the reduction furnace will not dilute the flash calciner gases. This will result in a higher concentration of $SO_2$ in the gases reporting to the sulfuric acid plant than is possible in the prior art of coproduction of sulfuric acid and Portland cement.

FIG. 2 represents a second embodiment of my invention. The main departure from the three stage process described in FIG. 1 is that herein the calcium sulfide produced in the reduction stage is hydrolized with steam and $CO_2$ to obtain calcium carbonate and hydrogen sulfide ($H_2S$) rich gases which are burned to sulfur dioxide as they enter the flash calciner 44. This arrangement offers improved thermal efficiency because the highly exothermic oxidation reaction $$H_2S + 1\tfrac{1}{2}O_2 = SO_2 + H_2O$$

provides heat to counteract the highly endothermic decomposition of calcium carbonate taking place at the flash calciner and to bring materials to reaction temperature.

Another important deviation in FIG. 2 is that all of the calcium sulfate source is fed to the reduction furnace 26 while it would be recalled that only ¼ of the calcium sulfate source was fed to the reduction furnace in the case of FIG. 1. A fluidized bed reactor with its higher throughput capability is preferred for reduction in this embodiment due to its required handling of four times the amount of calcium sulfate prescribed in FIG. 1.

The reduction to calcium sulfide and its hydrolysis are performed in a two vessel, or offset design, fluo solids reactor. In the first vessel or reduction stage 26, reactor fuel is injected underneath each bed as is standard practice with fluidized bed reactors. A sufficient amount of kiln cooler secondary air is injected at 30 to obtain partial combustion of the fuel. The calcium sulfide produced in the first reactor vessel flows to the hydrolysis reactor 32 where steam 36 and $CO_2$ recycle gases 34 from the reduction furnace are introduced. The calcium carbonate flows onto the flash calciner at 42 while the $H_2S$ is burned at 38 to provide exothermic heat at the flash calciner whose function is the normal one in the modern portland cement industry i.e., flash calcination of calcium carbonate.

The cement raw mix components are added at 2 with the calcium sulfate source. Solid reductants on the other hand are introduced at 14, to prevent premature C loss to oxidation reactions, joining the rest of the reduction furnace feed at 18. As in FIG. 1, the iron, and aluminum cement raw mix compounds perform a dual role as additives providing improved kinetics of reduction as well as a lower reduction temperature, and later participating in the clinkering reactions at a higher temperature in the rotary kiln.

All of the feed material except the solid reductants are fed at 2 and are preheated by the flash calciner gases in three stages of suspension preheating at 6, 8, and 10. Secondary air from the kiln cooler optionally can be used at 40 to oxidize the $H_2S$ rich gases. The portland cement raw materials are separated from the gas stream of the flash calciner and report to the rotary kiln at 46.

DESCRIPTION OF INVENTION—EMBODIMENT NO. 1

List of reference numerals for FIG. 1

2—Reduction furnace feed consisting of: one fourth of the calcium sulfate, all of the reducing carbon, and from one fourth to all of the iron aluminum and silica raw materials required for portland cement manufacture.

4—Reduction furnace feed preheater and cyclonic collector.

6—Reduction furnace feed preheater exhaust gases to bag-house or electrostatic precipitator.

8—Reduction furnace feed is insufflated by kiln cooler secondary and/or tertiary air entering into preheating chamber at the top of the reduction furnace.

10—Kiln cooler secondary and/or tertiary air inlet.

12—Reduction furnace-multiple hearth with rabble arms type. The iron and aluminum compounds injected with the feed have a synergistic effect improving reaction kinetics and lowering reaction temperature. Burners and sufficient kiln cooler secondary air for partial combustion of the fuel control reduction reaction at each individual hearth providing an optimum heating rate profile as well as improved contact between solids and gaseous reductants.

14—Calcium sulfide is discharged onto flash firing leg of the calcium sulfate decomposition furnace.

16—Inlet of main portion of calcium sulfate source consisting of ¾ of the total amount treated by the overall process system; also added at this point is the balance of the sources of iron, aluminum and silica or raw mix components of portland cement.

18, 19, 20—The raw materials entered at 16 are preheated in three stages of cyclonic reinforced suspension preheaters.

22—Preheated calcium sulfate and raw materials are discharged onto flash firing leg of calcium sulfate decomposition furnace.

24—Calcium sulfide and calcium sulfate are simultaneously blown into the flash calciner by burners and kiln cooler secondary air injected at this point. In various other commercial flash calciner variations, materials are fed near the upper mid-section of the flash calciner while symmetric kiln cooler secondary air inlets and burners oppose each other respectively or create a vortex by tangential peripheral arrangement at a lower section of the flash calciner.

26—Calcium sulfate decomposition reaction furnace—flash calciner.

28—Lime and the other portland cement raw mix components are separated from $SO_2$ rich gases and discharged onto rotary kiln.

30—Outlet for $SO_2$ rich gases proceeding for treatment at sulfuric acid plant.

32—Short rotary kiln, rotated at four times the conventional speed in dual sulfuric acid and cement prior art.

DESCRIPTION OF INVENTION—EMBODIMENT NO. 2

List of reference numerals for FIG. 2

2—Feed point of calcium sulfate source as well as iron, aluminum and silica raw materials for portland cement manufacture.

4—Outlet for $SO_2$ rich gases proceeding for treatment at sulfuric acid plant.

6, 8, 10—The raw materials entered at 2 are incrementally preheated in three stages of cyclonic reinforced suspension preheaters.

12—Preheated raw materials are discharged onto reduction furnace.

14—Inlet for carbonaceous solid reductants.

16—Reduction furnace cyclonic dust collector and solid reductants preheater.

18—Preheated solid reductants and dust join the rest of the preheated raw materials.

20—A stream of $CO_2$ rich reduction furnace gases is recycled to hydrolysis furnace.

22—Waste heat boiler recovers heat from reduction furnace gases and produces steam to be used in hydrolysis reaction.

24—Reduction furnace cyclone exhaust gases leave the system to be treated in bag house or electrostatic precipitator.

26—The reduction furnace is the first vessel of a two vessel fluidized bed reactor, example Dorr Oliver's off-set design fluidized bed reactor which is shown in this figure. Although hot gases from the second stage fluo solids reactor are normally injected at the bottom of the first, in our process they are routed to the flash calciner instead.

28—Transfer point of calcium sulfide from first to second stage fluo solids reactor. Solids temperature 700° C. to 800° C.

30—Rotary kiln cooler secondary air injected.

32—Second stage fluo solids reactor where hydrolysis reaction

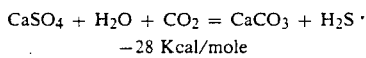

$$CaSO_4 + H_2O + CO_2 = CaCO_3 + H_2S \cdot$$
$$-28 \text{ Kcal/mole}$$

takes place at a temperature range of 150° C. to 650° C.

34—Recycle of $CO_2$ rich reduction furnace gases tapped at 20 are injected at this point.

36—Steam produced at waste heat boiler 22 joins the $CO_2$ recycle as they enter the second stage fluo solids furnace.

38—Hydrogen sulfide in gases leaving the hydrolysis reactor are oxidized to furnish exothermic heat to the flash calcination step.

40—Rotary kiln cooler secondary air inlet.

42—Calcium carbonate and other raw mix compounds are discharged onto flash calciner.

44—Flash calciner where $CaCO_3$ decomposition takes place.

26—Lime and the other portland cement raw mix compounds are separated from $SO_2$ rich gases and discharged onto rotary kiln.

48—Short rotary kiln rotated at four times the speed used in dual sulfuric acid and cement prior art inasmuch as only the solid reactions known as clinkering will be performed in this furnace.

DESCRIPTION OF INVENTION—FIG. 3

A Kiln Temperature Profile Example

FIG. 3 has as its main objective to depict in a graphic form some of the main disadvantages of the prior art which carries all three reactions: reduction, decomposition, and clinkering inside the kiln.

Curve 3 represents the prior art. Curve 1 represents conditions in a short kiln required for clinkering only in Embodiment #1, FIG. 1. Curve 2 corresponds to Embodiment #2, FIG. #2. Each curve is subdivided into solids profile A shown with full lines—and combustion gases profile B shown with broken lines - - - The thermal conditions depicted in prior art curve #3 are those of a 16' by 500 ft kiln while the corresponding short kiln of the proposed technology (curves 1 and 2) is 16' diameter by 213 ft. This is just meant to emphasize the differences in kiln length requirements. It is not intended to portray that both long and short kiln produce the same daily tonnage since the short kiln is operated at 3-4 times the RPM of the long kiln and therefore, these systems are rated to produce three or four times as much clinker as the long kiln method. Conversely, a small diameter kiln can be designed with equivalent capacity to the large diameter prior art kiln.

Another disadvantage of the prior art which is partially depicted is the poor heat transfer characteristics of the long kiln. Curve 3 shows a wider separation between the combustion gases and solids temperature profiles than the proposed systems in curves 1 and 2. The lingering cooling effect on the solids caused by the endothermic decomposition reaction in the case of the long kiln has a flattening effect on curve 3A while they behave almost isothermally for a good portion of the kiln. This does not happen in curves 1A and 2A inasmuch as gypsum decomposition takes place outside of the short kiln while clinkering reactions are exothermic.

Clinkering in curve #1A can take place at temperatures 100° C. lower than in curve #3A due to lower flame temperature requirements in the shorter kiln. Again, for equivalent raw mixes clinkering in curve 2A can take place at 60° C. lower temperatures than in the case of curve 1A. This temperature differential results from the higher decomposition reaction temperature of gypsum which determines a higher kiln inlet temperature for curve 1A than the one portrayed in curve 2A which is dependent on the calcination of calcium carbonate on the previous step. Overall retention time for the long kiln of curve #3 varies from 6 to 7 hrs while that of the processes represented by curves 1 and 2 (including reduction and decomposition reactions) is only 1½ to 2½ hrs.

The significance of the lower retention times is that all three furnaces in embodiments 1 and 2 represent a capital disbursement equal to or slightly higher that a single long kiln system. However, when a formal curve of capital dollars vs various production rates is plotted there cannot be a question that the three and four stage proposed systems will require less capital dollars per ton of product since they can outproduce the prior art by a factor of 3 at the least.

OPERATION OF INVENTION

The process of the present invention is an improvement of the old Muller-Kuhne technology to produce cement clinker, suitable for the manufacture of high quality portland cement, and sulphur dioxide by burning calcium sulfate which can be broadly characterized by the treatment of the basic thermochemical reactions in individual furnace units particularly adept to optimize process variables affecting each of the component thermochemical processes.

Other departures and improvements will follow as we proceed to describe the operation of two embodiments of the proposed invention, which apply to all forms of calcium sulfate: anhydrite, gypsum rock and waste gypsum produced in phosphoric acid manufacture.

EMBODIMENT #1—OPERATION

Various methods of feed preparation and injection can be used depending on the type and impurity content in feed material. The most classic approach follows the procedure used with portland cement raw mixes containing limestone. The calcium sulfate is delivered by belt conveyor to the pyrometallurgical facility where drying or calcining will be in order. This is performed in rotary calciners or dryers or if grinding is required drying and grinding can be performed by circulating preheater exhaust gases through the grinding unit which could be of the ball or roller mill type.

In the case of phosphogypsum calcination will be required for fluorine removal if the "wet process" phosphoric acid technology used to produce the waste gypsum has not removed the fluorine otherwise. If this is the case phosphogypsum can be handled similarly to gypsum rock or anhydrite except that blending with the other raw mix components instead of grinding is all that is needed.

The dried gypsum is sent pneumatically to a storage silo. Conveyor belt transport can be used successfully since losses are high due to the fineness of the gypsum. The other components can be stored outside in the open prior to processing. The clay, after passing through a crusher, and the sand are dried then stored separately in a raw material storage bin. Coke and the iron oxide source are also stored separately before being fed to the crude powder mill where the coke, clay sand and $Fe_2O_3$ component are proportioned crushed and intimately mixed, thus removing any residual humidity. The powder is then sent pneumatically to the homogenizing and storage silos.

Most of the above is common to the prior art in the Muller-Kuhne technology where we begin to deviate is as follows: one fourth of the dried gypsum rock (or calcined gypsum waste) is weighed, fed to a mixer with the rest of the raw mix components and then delivered to a homogenizing silo. Enclosed conveyors are used to transport the raw mix to the metering devices, prior to its being fed into the oil or coal fired reduction furnace. An alternative approach in the case of phophogypsum treated by this process is that one fourth of the gypsum can be fed directly "as is" to the reduction furnace step. The rest of the gypsum, i.e., three fourth of the weighed dry gypsum will be delivered to a bin feeding the top preheater of the preheater precalciner system. Alternatively the waste gypsum, right from the last section of the wet process phosphoric acid plant filter, is fed directly to the bin feeding the top preheater. In this case it is desirable that the filter in question has the capability of delivering the waste gypsum with the minimal amount of moisture. One such filter is the UCEGO filter which is part of the Rhone Poulenc di-hydrate process of phosphoric acid manufacture.

Since the gases leaving the top cyclonic preheaters are treated in a conventional manner, i.e., dust removal in an electrostatic precipitator and drying, some thought will be given to whether dry or "as is" calcium sulfate is injected at the preheater. The main consideration would be avoiding condensation in the electrostatic precipitator. Again the method to be chosen depends on the type of gypsum.

An improved method to dry the gypsum if this is desirable and if F removal has been achieved in the "wet process" chemistry is to introduce the gypsum to the preheater section by means of injection using a hollow screw conveyor through which a fluid heated to a temperature above 100° C. is circulated to thereby effect indirect heat exchange with the advancing gypsum. The heating fluid providing indirect heating can gain its temperature by an exchanger heated with the preheating system gases. This type of equipment is described in U.S. Pat. No. 2,788,960 to Skinner for Apr. 16, 1957, which uses this system to produce a hemihydrate form of gypsum plaster. Dowtherm also manufactures and sells sophisticated variations of this equipment. The hollow flight conveyor mainly used for cooling has been used for many years in the metallurgical industry. However, the unique application described herein is novel as far as I know.

At this point we would like to emphasize that the use of suspension preheaters precalciners for the manufacture of portland cement from raw mixes containing calcium carbonate has proven successful in the cement industry. The use of similar equipment with calcium sulfate raw mixes is complicated by reduction reaction requirements at the front end of the system such as a source of reducing C being present in the raw mix. In effect, carbon begins to burn away in the gas phase in the preheaters and is thus disadvantageously withdrawn from the reaction as soon as temperatures in the range of 720° to 780° C. are reached. Providing both reducing and oxidizing atmospheres in the flash calciner is even more of a problem than for units we have detailed in our prior art discussion. In our invention carbon is fed with the rest of the raw mix components and one fourth of the $CaSO_4$ to a reducing furnace while the modern preheater precalciner equipment is used under the same conditions in which it is very efficient in the cement industry, i.e., for treatment of the endothermic decomposition of $CaCO_3$ under only oxidizing conditions. In our case for the decomposition, desulfurizing, reaction of calcium sulfide with the main portion of the calcium sulfate which is also a highly endothermic reaction. To my knowledge there is no precedent to this scheme which allows preheater precalciner equipment to do what it does best i.e., provide immediate response and high heat transfer where an endothermic reaction occurs!.

In this embodiment the preheaters will still bring three fourth of the gypsum charge close to the $CaSO_4$ decomposition temperature, which is higher than that of $CaCO_3$, without incurring in unnecessary losses of reductive carbon. There are various patents in the reference literature which inject the carbon at one preheater stage and the gypsum at another preheater stage. (British patent Specifications 1206193 for Sept. 23, 1970 and 1235864 for June 16, 1971 in reference to suspension preheater kilns used in the prior art). In our invention the carbon does not enter the pyrometalluergical system through the preheaters at all. This also obviates the need of providing a reducing atmosphere right at the kin flame in order to control suspension preheater kiln feed end temperature under the range of 730° to 780° C. This would also be a requirement if it were attempted to perform reduction and decomposition with a precalciner kiln, in which case partial combustion would be required at the flash calciner. All of these shortcomings would make direct application of the precalciner kiln technology to reduction and decomposition of gypsum inefficient if not impossible.

As indicated in the description of our invention and as shown on FIG. 1 reduction requires a separate and simultaneous flow scheme. The mixture of reducing coal, portland cement raw mix materials and one fourth of the gypsum, all of which is finely ground, is mixed with secondary and/or tertiary air proceeding from the kiln cooler, and injected into a preheating chamber of a multiple-hearth furnace. This chamber, where the material is fluidized takes the place of the upper hearth and speeds up the process of preheating so that reduction can be accomplished with a minimal amount of hearths. As we have previously stated the objective of the reduction step is to produce calcium sulfide only $$CaSO_4 + 2C = CaS + 2CO_2$$

or $CaSO_4 + 4CO = CaS + 4CO_2$

Consequently, the lower portion of the reduction furnace is a multiple-hearth furnace specially adequate to perform the reduction reaction at a minimum temperature and retention time by providing control of reduction atmospheres and optimum heating profile as well as enhanced solids to gas contact and heat transfer. In fact, in the metallurgical industry the multiple-hearth furnaces have been known to perform difficult reduction assignments impossible to accomplish in kilns or fluidized bed equipment. Example, the reduction of nickeliferous laterites in the Caron process.

Multiple-hearth furnaces are known under various names, the Herreshoff, McDougal, Wedge, Pacific, etc. It consists of a number of annular-shaped hearths mounted one above the other. There are rabble arms on each hearth driven from a common center shaft. The arms move the charge outward to the periphery where it falls to the next hearth. Here it is moved again to the center from which it falls to the next hearth. This continues down the furnace. The hollow center shaft is cooled internally by forced-air circulation. The preheating chamber at the top where reduction does not occur provides increased gas solids contact and heat transfer by fluidization. To our knowledge, there is no multiple-hearth furnace in the prior art with this feature. Providing kiln-cooler secondary or tertiary air to this chamber may be considered obvious to those familiar with the state of the art.

The Portland cement ingredients fed to the reduction furnace with one fourth of the calcium sulfate have a synergistic effect in the kinetics of the reduction reaction. Therefore, these additives have a dual role in optimizing reduction variables while later reacting with lime to produce clinker. This is one more reason to perform reduction apart in equipment most suitable to this complex endeavor. From the lower end of the Herreshoff furnace the calcium sulfide is transferred directly to the flash calciner. We already have referred to a component of this system, the various stages of suspension preheaters where the combustion gases containing reaction products transfer heat to the incoming main portion (¾) of the gypsum charge.

Thus, at the flash calciner gypsum from the preheaters meets calcium sulfide produced in the Herreshoff in a continuous basis and the following reaction takes place:

$$3CaSO_4 + CaS = 4CaO + 4SO_2$$

The $SO_2$ reports to the precalciner preheating system while $CO_2$ rich gases issue from the reduction furnace preheater. The ability to separate these streams is an improvement over the prior art.

The flash calciner is basically a stationary cylindrical furnace which accomplishes 90 to 100% of the calcination of calcium carbonate in standard portland cement processing at about 900° C. In our particular application the flash calciner accomplishes 80 to 90% of the decomposition (desulfurization) reaction at 1200° C. If higher percentage desulfurization is desired two flash calcining stages would be required. Fuel is normally fired in amounts equal to 50-60% of the total required for calcining and clinkering. We have already emphasized the importance of immediately responding to the heat sink produced by the decomposition reaction with heat of radiation from the flame of the flash calciner burners.

By this expedient large-capacity plants can be built with small kiln dimensions, making for more economic manufacture and lengthening the life of refractory brick (which tails off dramatically as kiln size goes up). At this writing there are 23 models of flash calciners offered by 28 manufacturers.

The Japanese companies Ikawajima-Harima Heavy Industries Co. (IHI) and Onoda Cement Co. were the first to pioneer and develop the flash calciner. The flash calciner discharges onto the rotary kiln, that due to its reduced functions is small and about 40% of the length that would be required in the absence of the flash calciner. Aside from this characteristics the kiln and cement cooler are about equal to what is used in the art of portland cement making.

Cement kiln details of construction are not considered relevant since direct-heat rotary kilns have been used for long and they continue to be one of the most important of the high temperature process furnaces. Consequently, they are very well covered in handbooks and cement industry literature. What needs to be emphasized is that the long kiln in the prior art of the Muller-Kuhne technology used to perform drying, reduction, preheating, calcium sulfate decomposition into lime and finally clinkering at the burning zone.

In the short kiln of our process only clinkering will be performed and we have already dwelled on the significance in improved production and capital savings resulting from this system. To my knowledge the precalciner short kiln combination has not been used in burning gypsum to make portland cement due to specific problems outlined above which our present invention solves. The precalciner short kiln has found recently wide application in making cement from the standard source of lime, calcium carbonate, where a complex reduction reaction is not required and all that is needed is to provide heat for the less endothermic decomposition of limestone under oxidizing conditions.

EMBODIMENT NO. 2—OPERATION

The operation of this embodiment is self explanatory from the process description. This scheme follows a 4 step thermochemical route instead of the three steps of embodiment No. 1. The major differences are:

1) All the gypsum is converted to calcium sulfide in the first vessel of a two vessel, offset design, fluidized bed reactor.

2) In the second vessel calcium sulfide is converted to calcium carbonate and hydrogen sulfide by reaction with steam and carbon dioxide at relatively low temperatures (150° C. to 650° C.)

3) Hydrogen sulfide is burned at the inlet of the precalciner to supply some of the heat requirements at the precalciner.

4) The precalciner function is to burn calcium carbonate to lime and $CO_2$. This can be done at standard calcination temperatures of limestone raw mixes i.e., 900° C.

5) The lower precalciner temperature and lower flame temperature required by just clinkering determines a burning zone temperature 160° C. lower than is customary in the prior art.

CONCLUSION AND SCOPE OF INVENTION

Gypsum and anhydrite have been used as sources for the production of Portland cement and sulphuric acid since the turn of the century. Commercial plants have been built in Germany, England, France, Austria, South Africa, and Poland. Present and past installations in these countries employ variations of the Muller-Kuhne technology which performs thermal reduction gypsum decomposition and clinkering reactions in rotary long kiln, using a carbon reductant. The sulphur is recovered as sulphur dioxide. A byproduct cement clinker is also obtained by the addition of pyrite or ferric oxide, alumina, and silica in proper proportions to the raw gypsum feed.

Except for special resource and economic circumstances peculiar to specific countries this process cannot compete on a free market basis with sulphuric acid made from elemental sulphur. The process of the present invention is an improvement of the old Muller-Kuhne technology to produce cement clinker, suitable for the manufacture of high quality Portland cement, and sulphur dioxide by burning calcium sulfate which can be broadly characterized by the treatment of the three basic thermochemical reactions in individual furnace units particularly adept to improve and maintain at an optimum point process variables affecting each of the component thermochemical processes.

Some of the processing advantages of our invention comprise: improved reduction reaction kinetics, decreased reduction temperature, decreased reduction retention time, application of heat of radiation to the highly endothermic gypsum decomposition reaction, simultaneous and separate reduction and decomposition so that the modern preheater flash calciner can be used for gypsum decomposition, increased kiln output to about four times that of the prior art, kiln shortened to 40% of the length used in the prior art.

In summary, the processing advantages of the three stage system of our invention translate in lower temperatures, minimum equipment size, minimum retention time, highly reliable and economic operation. Thus the reader will see that capital dollars per ton of product will be decreased as performance is enhanced by being able to use smaller and more adept unit furnaces.

While the above descriptions and figures contain many specificities, these should not be construed as limitations on the scope of the invention, but rather as an exemplification of two preferred embodiments thereof. Many other variations are possible. For example, the reduction reaction furnace can be an oscillating plate furnace that uses electron beam for heating. The desulfurization reaction furnace could incorporate a small plasma arc in addition to standard fossil fuel burners. Such a furnace is described in the Tylko process. The hydrolysis reaction of our Embodiment No. 2 could be enhanced by the use of microwave energy in the second vessel.

The third step will still be a short rotary kiln, since the peculiar combination of heating to incipient melting and mixing required by the clinkering solid reaction still makes the rotary kiln a good choice where high quality Portland cement is the objective.

It is conceivable that at times a mixture of limestone and gypsum as a source of lime might be desirable. It is also possible that we might want to shut down the reduction furnace and feed limestone only at point #26 on FIG. 1. In the above cases sulphur burners will partially or completely replace carbon fuel burners at the precalciners. The important point is that $SO_2$ gases leaving at point #30 on FIG. 1 will have sufficient concentration for sulphuric acid manufacture. The use of sulphur burners in flash calciners is in our understanding a novel feature in the operation of this equipment not to be found in the prior art.

I claim:

1. A process for manufacturing Portland cement clinker and sulfur dioxide from a preselected amount of calcium sulfate comprising:
   (a) reducing approximately one-quarter of said preselected amount of calcium sulfate with a carbon source in a first vessel whereby calcium sulfide is produced and carbon dioxide is released, while substantially avoiding the formation of calcium oxide;
   (b) preheating approximately three-quarters of said preselected amount of calcium sulfate in a second vessel separate from said first vessel;
   (c) introducing the calcium sulfide produced by step (a) and the preheated calcium sulfate resulting from step (b) into a calciner in the absence of a reducing agent whereby desulfurization results and calcium oxide and sulfur dioxide are produced;
   (d) separating the calcium oxide from the sulfur dioxide; and
   (e) combining calcium oxide with the compound selected from the group consisting of iron oxides, alumina, silica, and mixtures thereof in a rotary kiln whereby Portland cement clinker is formed.

2. The process according to claim 1 wherein said calcium sulfate is selected from the group consisting of anhydrite, gypsum rock, and waste gypsum produced in phosphoric acid manufacture.

3. The process according to claim 1 wherein said first vessel is a multiple-hearth furnace.

4. The process according to claim 3 wherein step (a) is preformed at a temperature not exceeding 700° C.

5. The process according to claim 4 wherein the calciner is a flash calciner.

6. The process according to claim 5 wherein step (c) occurs at a temperature in the range from 1150° C. to 1250° C.

7. The process according to claim 6 wherein the rotary kiln is about 200 feet in length.

8. The process according to claim 7 wherein step (e) is performed at a temperature of approximately 1350° C. in the rotary kiln.

9. A process for manufacturing Portland cement clinker and sulfur dioxide from a calcium sulfate source comprising:
   reducing entirely the calcium sulfate source with a carbon source in the presence of a compound selected from the group consisting of iron oxides, alumina, silica, and mixtures thereof in a reduction furnace whereby calcium sulfide is produced and carbon dioxide is released;
   hydrolyzing the produced calcium sulfide and the carbon dioxide with steam in a separate furnace whereby calcium carbonate and hydrogen sulfide are produced;
   burning hydrogen sulfide in a calciner whereby sulfur dioxide is produced and the calcium carbonate decomposes to calcium oxide and carbon dioxide;
   separating the calcium oxide and carbon dioxide from the sulfur dioxide; and combining the calcium oxide with the compound selected from the group consisting of iron oxides, alumina, silica, and mixtures thereof in a rotary kiln whereby Portland cement clinker is formed.

10. The process according to claim 9 wherein the reduction furnace is the first vessel of a two-vessel fluidized bed reactor and the separate hydrolysis furnace is the second vessel of a two-vessel fluidized bed reactor.

11. The process according to claim 10 wherein the reduction of calcium sulfate occurs at a exceeding temperature not exceeding 700° C.

12. The process according to claim 11 wherein hydrolysis of calcium sulfate occurs at a temperature in the range from about 150° C. to 650° C.

13. The process according to claim 12 wherein the calciner is a flash calciner.

14. The process according to claim 13 wherein the decomposition of calcium carbonate occurs at a temperature in the range from 870° C. to 930° C. in the flash calciner.

15. The process according to claim 14 wherein the rotary kiln is about 200 feet in length.

* * * * *